United States Patent [19]

Buonavita

[11] Patent Number: 4,480,252
[45] Date of Patent: Oct. 30, 1984

[54] GAS DETECTOR

[75] Inventor: Carlos E. Buonavita, Pasadena, Calif.

[73] Assignee: International Telephone & Telegraph Corporation, New York, N.Y.

[21] Appl. No.: 330,139

[22] Filed: Dec. 14, 1981

[51] Int. Cl.³ ............................................. G08B 17/10
[52] U.S. Cl. ................................. 340/632; 73/27 R; 422/96
[58] Field of Search ....................... 340/632, 633, 634; 422/96; 73/27 R

[56] References Cited

U.S. PATENT DOCUMENTS

| | | | |
|---|---|---|---|
| 3,801,972 | 4/1974 | Ho Kim et al. | 340/633 |
| 4,020,480 | 4/1977 | Gotley et al. | 340/633 X |
| 4,219,806 | 8/1980 | Enemark | 422/96 X |

Primary Examiner—James L. Rowland
Assistant Examiner—Daniel Myer
Attorney, Agent, or Firm—T. E. Kristofferson; A. D. Stolzy

[57] ABSTRACT

A pellistor type combustible gas detector including a Wheatstone bridge therefor fed from a voltage regulator and a constant current generator. Two comparators detect, for example, 50% to 75% of the lower explosive limit of the gas to be detected and 25% thereof, respectively. Latches keep indicator lamps lit and alarms turned on. The latches are selectively inhibited or not to check front panel and remote milliammeters calibrated in percent of gas concentration, and to test alarms. A gauged switch performs these and operating and reset functions. A circuit failure detector, lamp and alarm are also provided.

6 Claims, 8 Drawing Figures

GAS DETECTOR

BACKGROUND OF THE INVENTION

This invention relates to gas detectors and, more particularly, to a combustible gas detector.

PRIOR ART STATEMENT

In 1977 and 1979 publication of
The GEC Electronic Tube Company Limited
A Management Company which unites the activities of The M-O Valve Company Limited and English Electric Valve Company Limited;
English Electric Valve Company Limited
Waterhouse Lane, Chelmsford, Essex, CM1 2QU
Telephone: Chelmsford (0245) 61777 Telex: 99103; and
The M-O Valve Company Limited
Brook Green Works, Hammersmith, London W6 7PE
Telephone: 01-603 3431 Telex: 23435
disclose Wheatstone bridges and combustible gas detector elements therefor.

Operation of a Wheatstone bridge with a constant current is otherwise old in the prior art. See also Romo U.S. Pat. No. 4,202,218, issued May 13, 1980.

Signetics (811 East Arques Ave., Sunnyvale, Calif. 94086) manufactures a device called a "timer." This device is made under model numbers NE/SE555-/SE555C/SA555. The construction of this device is also illustrated in an August 1977 Signetics publication both schematically and diagrammatically.

SUMMARY OF THE INVENTION

In accordance with the present invention, two comparators actuate latches that illuminate indicators and/or actuate audible or other alarms. The same normally are actuated in succession or only one is actuated.

A circuit failure device can also be provided to operate a latch with an indicator and/or alarm.

Provision may be made to disable the latches.
Alarms may be checked.
An alarm reset may be provided.
Meter calibration or the like may be made while the alarms are disabled.

BRIEF DESCRIPTION OF THE DRAWINGS

In the accompanying drawings which illustrate exemplary embodiments of the present invention.

DESCRIPTION OF THE PREFERRED EMBODIMENTS

Figure 1:
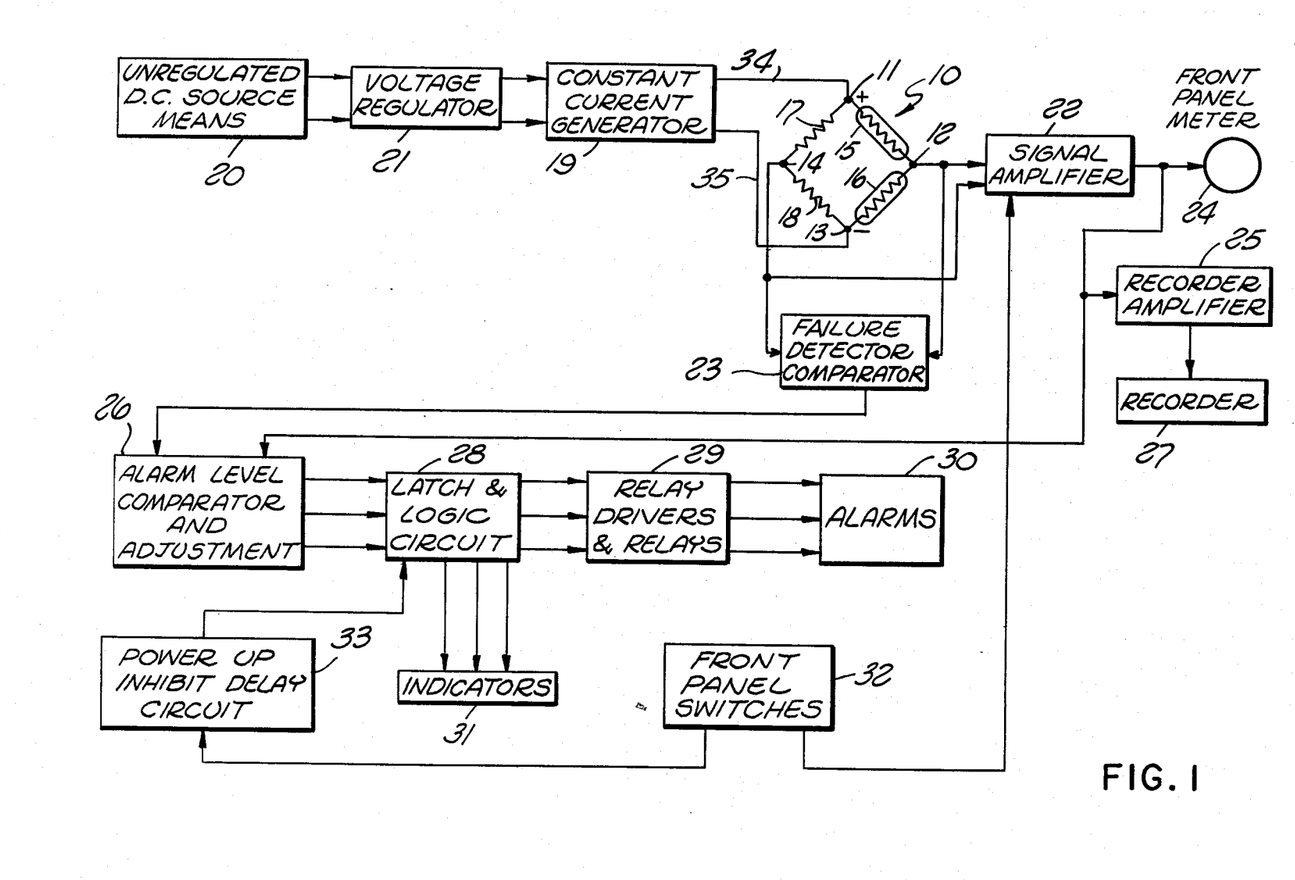
FIG. 1 is a block diagram, partly in schematic, of a combustible gas detector constructed in accordance with the present invention.

A Wheatstone bridge is shown at 10 in FIG. 1 having first, second, third and fourth junctions 11, 12, 13 and 14, respectively.

Conventional detector elements 15 and 16 are connected between junctions 11, 12 and 12, 13, respectively.

Resistors 17 and 18 are connected between junctions 14, 11 and 13, 14, respectively.

The input to the bridge 10 (junctions 11 and 13) is supplied via a constant current generator 19 connected from unregulated D.C. source means 20 through a conventional voltage regulator 21. Constant current generator 19 may be conventional or not.

The output from bridge 10 is taken from junctions 12 and 14. The output of bridge 10 is impressed upon both a signal amplifier 22 and a failure detector comparator 23.

Signal amplifier 22 has an output connected to a front panel meter 24, a recorder amplifier 25 and an alarm level comparator and adjustment 26.

Comparator 23 also has an output connected to comparator and adjustment 26.

A recorder 27 is connected from recorder amplifier 25. Both recorder amplifier 25 and recorder 27 are entirely conventional.

A latch and logic circuit 28, relay drivers and relays 29 and alarms 30 are connected in succession from comparator and adjustment 26.

Circuit 28, drivers and relays 29 and alarms 30 each have three paths. An "ALARM" path corresponds, for example, to a percentage within the range of 50% to 75% of the lower explosive limit (LEL) of the gas in which element 15 and/or element 16 is immersed. A "WARN" path may correspond to 25% of the LEL. A "FAIL" path may correspond to the output of comparator 23.

Drivers and relays 29 and alarms 30 (which may be audible) may both be entirely conventional.

Indicators 31 are connected from respective paths within circuit 28.

Front panel switches 32 connect with a power up inhibit delay circuit 33 and signal amplifier 22 for operation in "CHECK", "READY", "RESET" and "TEST" modes. The output from switches 32 to circuit 33 is a switching signal. The output from switches 32 to signal amplifier 22 is a voltage which is added to the output voltage of bridge 10 for checking current meters, indicators and alarms.

Switches 32 also select the "READY" mode for regular operation, and to select the "RESET" mode to turn off alarms and indicators, and to unlatch the "FAIL" path.

OPERATION

In FIG. 1, means 20 supplies an unregulated voltage which is regulated by regulator 21 and impressed upon constant current generator 19.

Generator 19 maintains the same constant current in electrical leads 34 and 35.

Element 15 and/or element 16 are immersed in a combustible gas.

Comparator 23 determines circuit failure and turns on alarms 30 and indicators 31 via comparator and adjustment 26, circuit 28 and drivers and relays 29.

Comparator and adjustment 26 actuates alarms 30 and indicators 31 corresponding to ALARM (50%–75% LEL) and/or WARN (25% LEL) and/or FAIL, the latter being for a corresponding output of comparator 23.

Switches 32 are operated to check meters, to allow regular operation, to permit reset and in an alarm test position.

Figure 2:
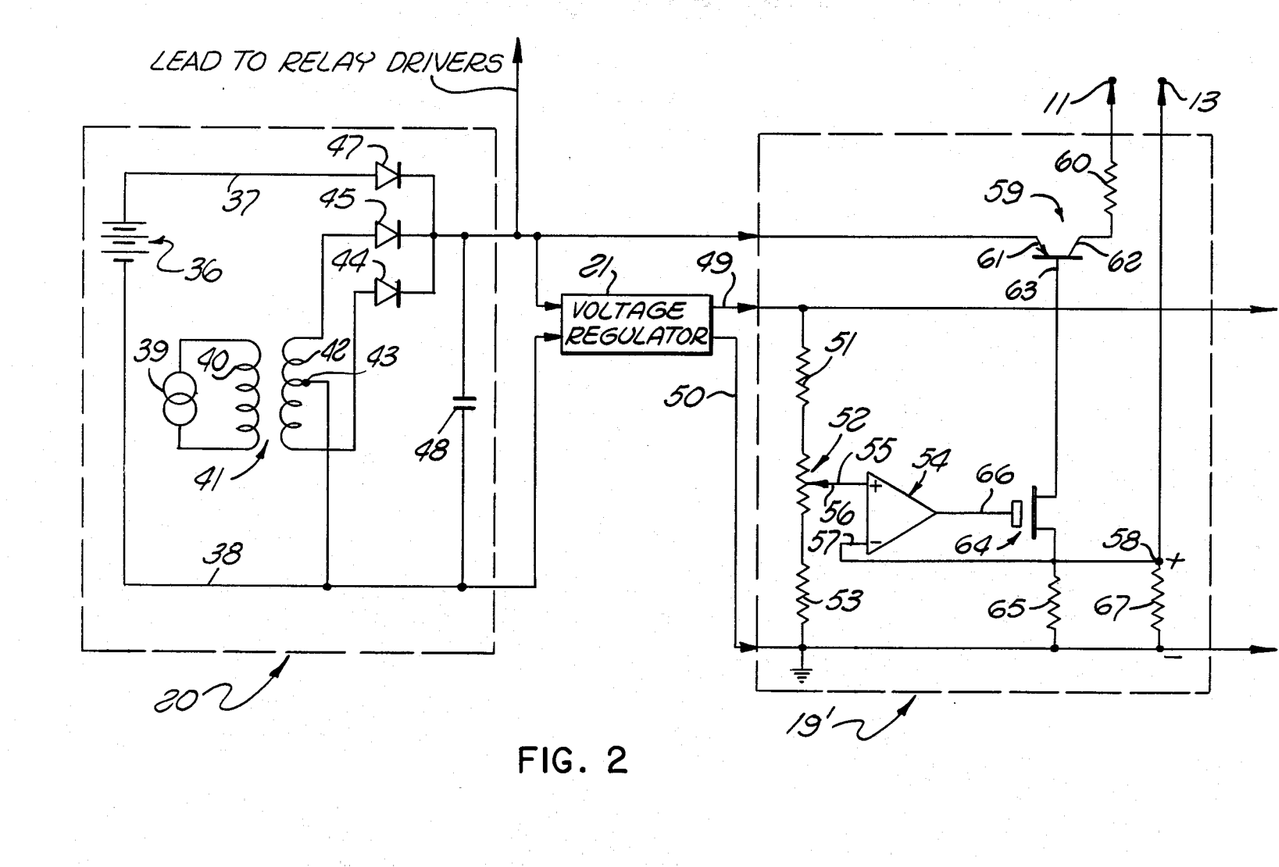
FIG. 2 is a schematic diagram of D.C. source means and a constant current generator connected by a voltage regulator.

Means 20, regulator 21 and a constant current generator 19' serving the same purpose as generator 19 is shown in FIG. 2.

A fail safe battery is provided in means 20 at 36 connected between leads 37 and 38. An A.C. source of potential 39 is connected to the primary 40 of a transformer 41. Transformer 41 has a secondary 42 with a center tap 43 connected to lead 38.

Rectifiers 44 and 45 are connected from the ends of secondary 42 to an output lead 46. A third rectifier 47 is connected between leads 37 and 46. A capacitor 48 is connected between leads 38 and 46. Leads 38 and 46 are connected to and provide an input to voltage regulator 21.

Voltage regulator 21 has output leads 49 and 50 connected to generator 19'. Lead 46 extends through means 20 and into generator 19' as well.

A resistor 51, a potentiometer 52 and a resistor 53 are connected in series from lead 49 to grounded lead 50 (lead 38 is also grounded). Generator 19' has a differential amplifier 54 including a non-inverting input lead 55 connected from a potentiometer wiper 56 and an inverting input lead 57 connected from a feedback junction 58.

A transistor 59 and a resistor 60 are connected from lead 46 to bridge junction 11. Transistor 59 has an emitter 61, a collector 62 and a base 63. Base 63 is connected through a field effect transistor (FET) 64 and a resistor 65 to lead 50. The output of amplifier 54 is connected to a gate 66 of FET 64.

A resistor 67 is connected from junction 58 to lead 50.

Bridge junction 13 is connected from feedback junction 58. The voltage across resistor 67 is directly proportional to the bridge current. The current to inverting input lead 57 of amplifier 54 is negligible compared to that flowing in resistor 67 due to the high input impedance of amplifier 54. The current to junction 11 and from junction 13 is thus constant because the potential of wiper 56 is regulated and FET 64 is driven until the potential of junction 58 is equal to that of wiper 56, as is well known.

Figure 3:
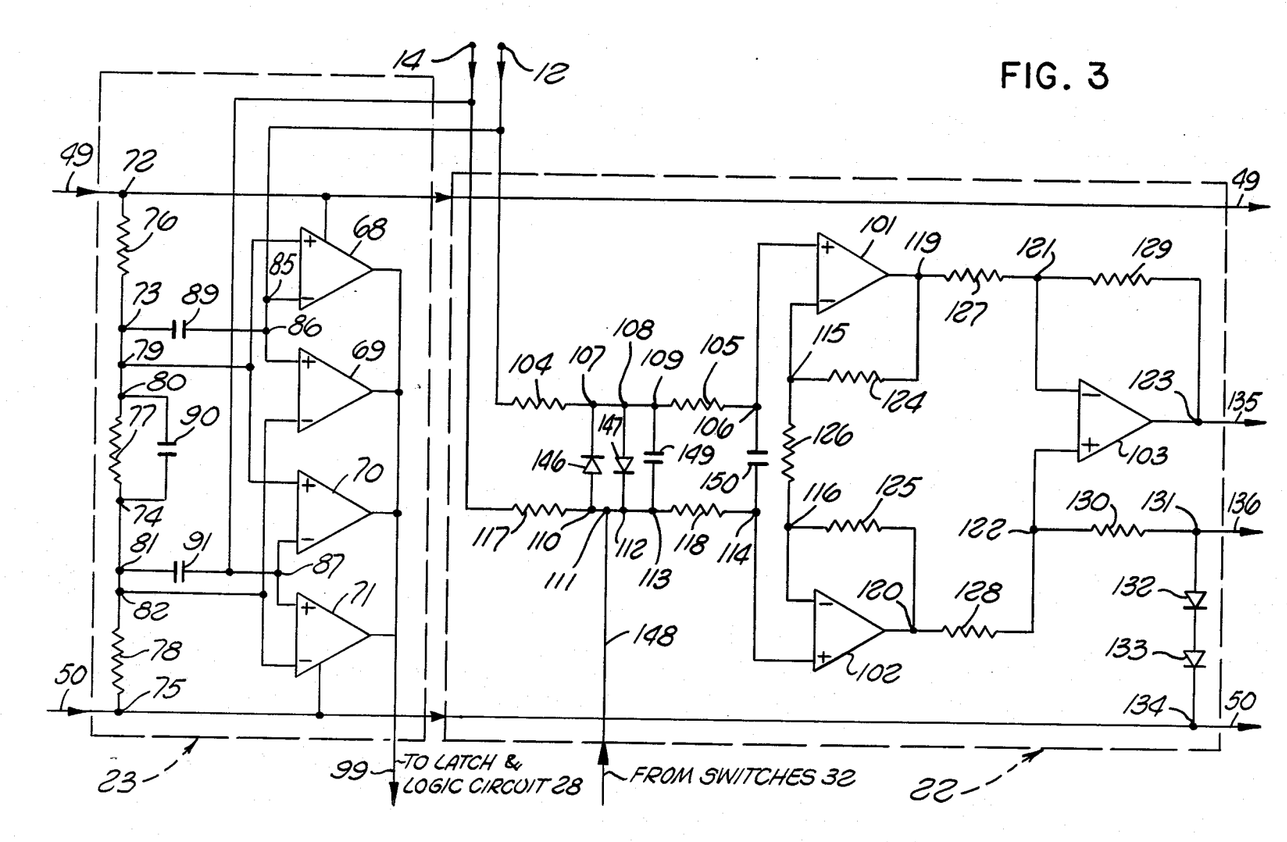
FIG. 3 is a schematic diagram of a failure detector comparator and a signal amplifier.

Comparator 23 and signal amplifier 22 are shown again in FIG. 3.

Note that junctions 12 and 14 are shown both in FIG. 1 and in FIG. 3.

Differential amplifiers are provided in FIG. 3 at 68, 69, 70 and 71. Junction 12 is connected to the inverting input of amplifier 68 and to the non-inverting input of amplifier 69. Junction 14 is connected to the inverting input of amplifier 70 and to the non-inverting input of amplifier 71.

Junctions 72, 73, 74 and 75 are provided in FIG. 3, where a resistor 76 is connected between junctions 72 and 73, a resistor 77 is connected between junctions 73 and 74, and a resistor 78 is connected between junctions 74 and 75. Leads 49 and 50 are connected to junctions 72 and 75, respectively.

Other junctions are provided in FIG. 3 at 79, 80, 81, 82, 83, 84, 85, 86, 87 and 88.

Junction 12 is connected to junctions 85 and 86. A capacitor 89 is connected between junctions 73 and 86. Junctions 73, 79 and 80 are connected together. Junctions 79 and 83 are connected together. Junction 83 is connected to the non-inverting inputs of amplifiers 68 and 70.

A capacitor 90 is connected in parallel with resistor 77.

A capacitor 91 is connected between junctions 81 and 84. Junctions 84 and 87 are connected together. Junctions 82 and 88 are connected together. Junction 87 is connected to the inverting input of amplifier 70 and to the non-inverting input of amplifier 71. Junction 88 is connected to the inverting inputs to amplifiers 69 and 71.

| Junction | Voltage (volts) |
|---|---|
| 72 | 8.50 |
| 79 | 2.78 |
| 82 | 1.78 |
| 75 | 0.00 |

Figure 5:
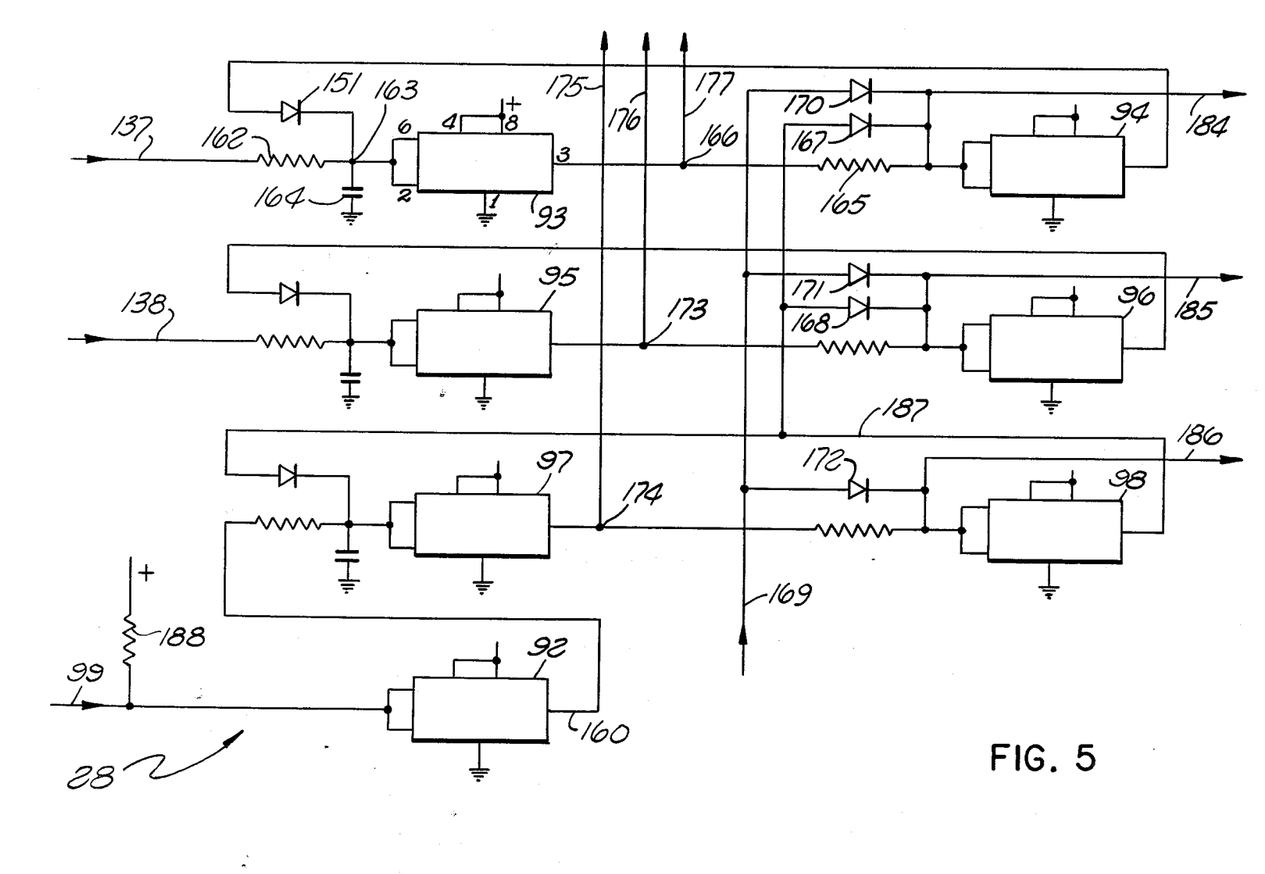
FIG. 5 is a schematic diagram of a latch and logic circuit.

When the output of any one of the amplifiers 68–71 is low, the aforementioned prior art "timer", e.g., device 92 in FIG. 5, may be considered an inverter with hysteresis and/or a time lag to cause another such device 97 to latch. Devices 93–98 in FIG. 5 are identical to device 92. Input lead 99 in FIG. 5 is the same lead as output lead 99 in FIG. 3.

When the potential of lead 99 rises above a certain threshold, the potential of output lead 100, FIG. 5, falls, step fashion. Conversely, when the potential of lead 99 falls below a certain threshold, output lead 100 rises, step fashion.

In FIG. 3, inputs to signal amplifier 22 are provided from junctions 12 and 14, and by leads 49 and 50. Leads 49 and 50 are also output leads therefrom and input leads to FIG. 4.

Signal amplifier 22 has differential amplifiers 101, 102 and 103. Resistors 104 and 105 are connected in series to a junction 106. Junction 106 is then connected to amplifier 101. Junctions 107, 108, 109, 110, 111, 112, 113, 114, 115 and 116 are also provided. Junctions 107, 108 and 109 are connected together between resistors 104 and 105.

A path is provided from junction 14 through a resistor 117, junctions 110, 111, 112 and 113, and through a resistor 118 and junction 114 to amplifier 102.

Junctions 115 and 116 are connected respectively to amplifiers 101 and 102.

In FIG. 3 further junctions 119, 120, 121, 122 and 123 are provided. A resistor 124 is connected between junctions 115 and 119. Junction 115 is connected to the inverting input of amplifier 101. The output of amplifier 101 is connected to junction 119.

A resistor 125 is connected between junctions 116 and 120, junction 116 being connected to the inverting input of amplifier 102. The output of amplifier 102 is also connected to junction 120.

A resistor 126 is connected between junctions 115 and 116. A resistor 127 is connected between junctions 119 and 121. A resistor 128 is connected between junctions 102 and 122. Junctions 121 and 122 are respectively connected to the inverting and non-inverting inputs to amplifier 103.

A resistor 129 is connected between junctions 121 and 123, and a resistor 130 is connected between junctions 122 and 131.

Diodes 132 and 133 are connected from junction 131 to junction 134.

Figure 8:
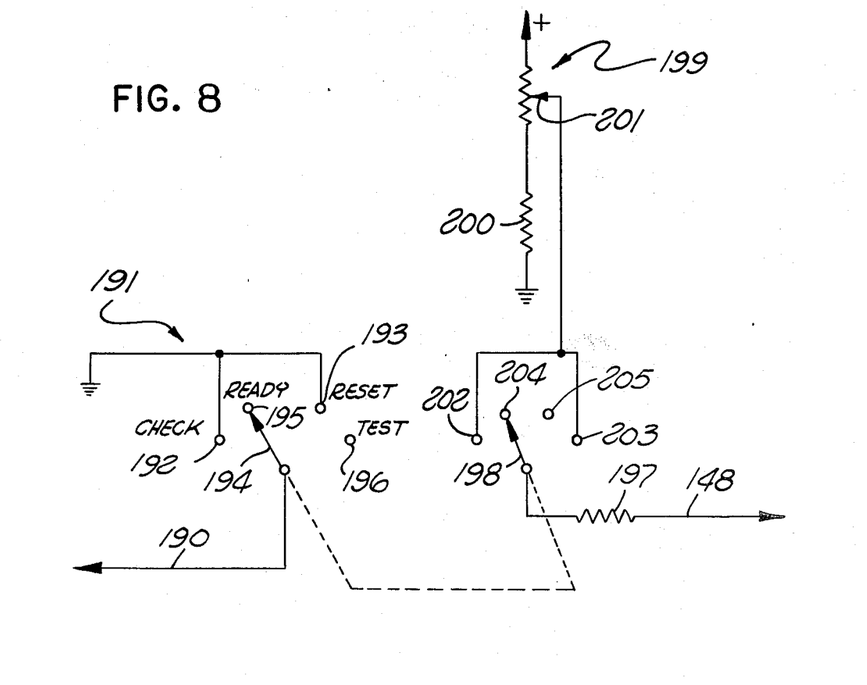
FIG. 8 is a schematic diagram of a switching circuit.

Diodes 146 and 147 are connected between respective junctions 107, 110 and 108, 112. Lead 148 is connected from switches 32 (FIGS. 1 and 8).

Capacitors 149 and 150 are connected between junctions 109, 113 and 106, 114, respectively.

Figure 4:
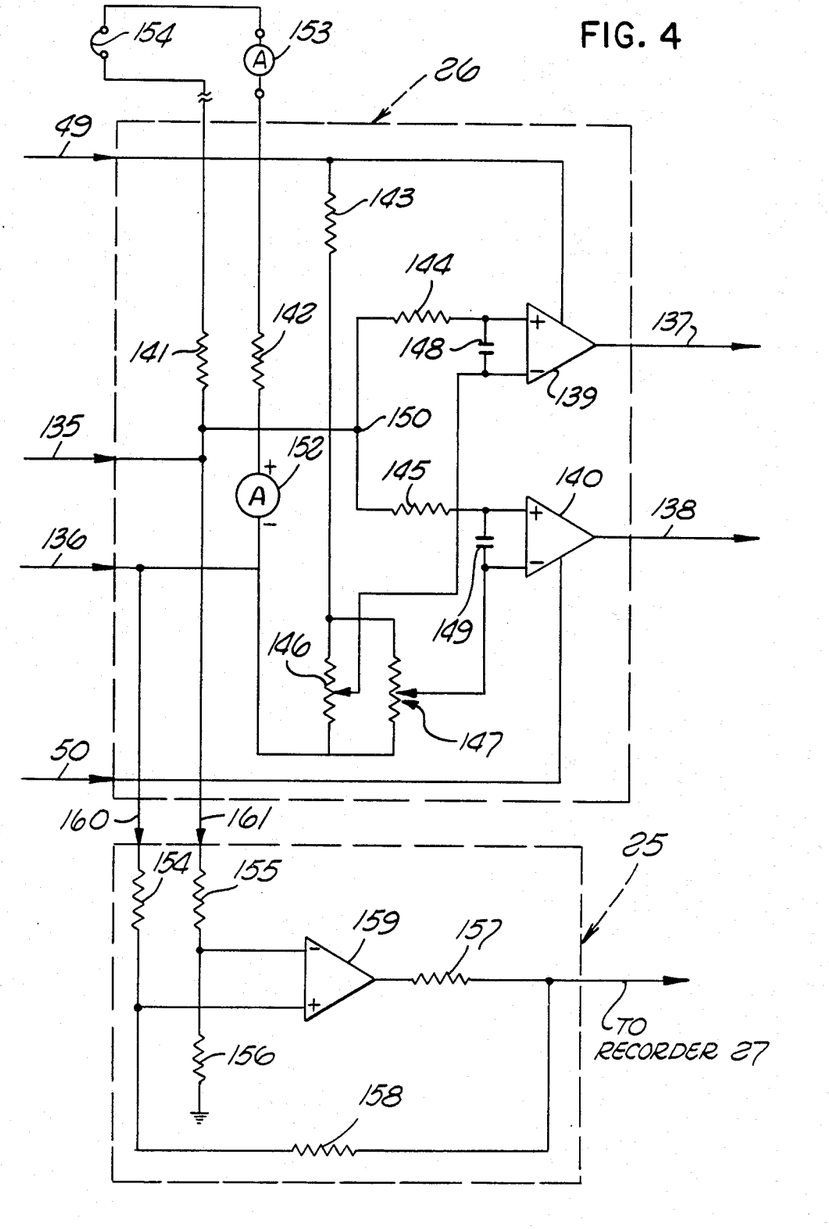
FIG. 4 is a schematic diagram of an alarm level comparator and adjustment, and a recorder amplifier.

Output leads 135 and 136 from FIG. 3 are the same input leads in FIG. 4.

Comparator and adjustment 26 and recorder amplifier 25 are shown both in FIG. 1 and in FIG. 4. Comparator and adjustment 26 has two outputs on leads 137 and 138 which are the input leads to the latch and logic circuit 28 shown both in FIG. 1 and in FIG. 5.

In FIG. 4, differential amplifiers are provided at 139 and 140. Resistors are provided at 141, 142, 143, 144 and 145. Potentiometers are provided at 146 and 147. Capacitors are provided at 148 and 149.

When the potential of junction 150 exceeds the potential of the wiper of pot 146, device 93 (FIG. 5) is latched. This is true because lead 137 goes high, the output of device 93 goes low, the output of device 94 goes high, and the high feedback through diode 151 will keep device 93 latched.

Actually, device 95 will latch first if pot 147 is set for, for example, 25% of the LEL of the gas. Thus pot 146 may be set corresponding to 50% to 75% of the LEL.

The outputs of amplifiers 139 and 140 will essentially be step functions.

A milliammeter 152 may indicate gas concentration as a percent of LEL.

A milliammeter 153 may be used locally as shown and at a remote location of a jumper 154 to check the accuracy of the milliammeter 152.

In amplifier 25, resistors 154, 155, 156, 157 and 158 are provided with a differential amplifier 159.

Amplifier 25 has input leads 161 and 160 connected respectively to leads 135 and 136.

The assembly surrounding devices 93, 95 and 97 are identical. Only that around device 93 will be described in detail.

In FIG. 5 a resistor 162 is connected from lead 137 to a junction 163. A capacitor 164 is connected from junction 163 to ground. Diode 151 is connected from the output of device 94 to junction 163. The input of device 93 is connected from junction 163.

Terminals 2 and 6 of device 93 are connected to junction 163. Terminals 4 and 8 are connected to a positive source of potential. Terminal 1 is grounded. All devices 92-98 are connected in this manner.

The circuit around device 96 is essentially identical to that around device 94. A resistor 165 is connected between the output of device 93 through a junction 166 to the input of device 94.

The output of device 98 is connected to the inputs of devices 94 and 96 via diodes 167 and 168, respectively.

Figure 6:
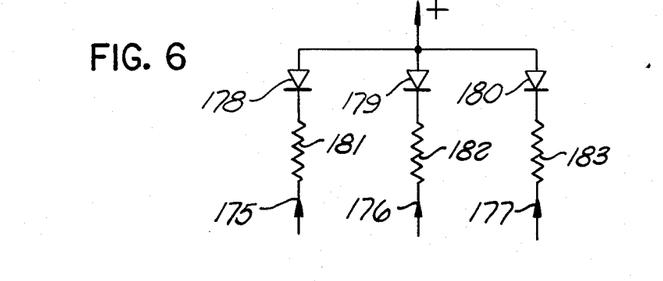
FIG. 6 is a schematic diagram of an indicator circuit.

Circuit 33 is connected to devices 94, 96 and 98 via a lead 169 (see FIGS. 1, 5 and 7) and diodes 170, 171 and 172. The output of devices 95 and 97 are connected to respective junctions 173 and 174. Output leads 175, 176 and 177 are connected from junctions 174, 173 and 166, respectively. Leads 175, 176 and 177 are connected to light emitting diodes 178, 179 and 180, respectively, via resistors 181, 182 and 183, respectively, shown in FIG. 6. Each light emitting diode is one of the indicators 31 (FIG. 1).

Each of leads 184, 185 and 186 operate a relay (not shown) with respective ALARM, WARN and FAIL contacts (not shown) for respective audible alarms (not shown).

Devices 94, 96 and 98 are disabled if the potential of lead 169 is high. That is, devices 93, 95 and 97 will remain unlatched or will be actuated to an unlatched state in such a case.

If the potential of lead 187 is high, again devices 93 and 95 will remain unlatched or be actuated to an unlatched state.

A resistor 188 is connected from lead 99 to a positive source of potential.

Latching caused by, for example, device 94 occurs when the output of device 94 goes high and output of device 93 is kept low because diode 151 is forward biased.

When lead 169 and/or lead 187 goes high, devices 93, 95 or 97 cannot be latched and will be unlatched if already latched.

Figure 7:
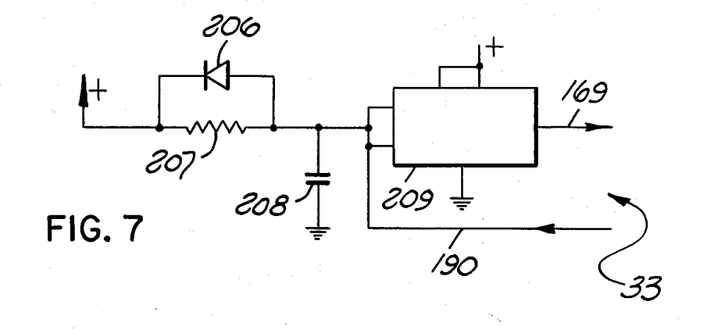
FIG. 7 is a schematic diagram of a power up inhibit delay circuit.

A device 209 in FIG. 7 may have a high input on lead 190 and a low output on lead 169 when the switch 191 in FIG. 8 is in the READY or TEST position. Conversely, device 209 in FIG. 7 will have a low input on lead 190 and a high output on lead 169 when switch 191 is in the CHECK or RESET position.

Note that lead 190 in FIG. 7 is the self same lead 190 in FIG. 8. In FIG. 7 there is provided a diode 206, a resistor 207 and a capacitor 208. Device 209 is identical to device 93, for example.

As shown in FIG. 8, CHECK and RESET contacts 192 and 193 are grounded. The same may be engaged by a pole 194. The READY and TEST contacts 195 and 196, respectively, are electrically isolated except when engaged by pole 194.

In FIG. 8, a resistor 197 is connected from a pole 198 ganged with pole 194 to lead 148. A potentiometer 199 and a resistor 200 are also provided. Potentiometer 199 has a wiper 201 connected to contacts 202 and 203 engagable by pole 198. Contacts 204 and 205 are essentially isolated as before.

Potentiometer 199 may be adjusted to add or to subtract from the bridge output to determine whether or not the milliammeters 152 and 153 read correctly when the alarms ring and vice versa, and to see if the alarms ring according to proper settings of potentiometers 146 and 147 and vice versa.

The phrase "indicator means" as used herein and in the claims is hereby defined to include indicators such as light emitting diodes 178, 179 and 180 or the equivalent thereof and/or audible alarms and/or the equivalent thereof.

What is claimed is:

1. A combustible gas detector comprising: a Wheatstone bridge including first, second, third and fourth terminal junctions, first and second combustible gas detector elements, said first element being connected between said first and second junctions, said second element being connected between said second and third junctions, said Wheatstone bridge including first and second resistors, said first resistor being connected between said first and fourth junctions, said second resistor being connected between said third and fourth junctions; source means including a constant current generator connected to deliver a constant current to said first junction and connected to receive said constant current from said third junction; first and second bridge output leads connected from said second and fourth junctions; a signal amplifier connected between said bridge output leads, said signal amplifier having at least first and second output leads; first and second comparators each connected from the first and second output leads of said signal amplifier, respectively, said first comparator producing a first stepped signal when the voltage between said bridge output leads corresponds to a fraction x of the lower explosive limit of a detected gas, said second comparator producing a second stepped signal when the voltage between said bridge output leads corresponds to a fraction y of the lower explosive limit of said detected gas, x being larger than y, said first and second comparators having first and second respective output leads; first and second indicator means including first and second respective alarms for indicating the magnitude of any signal appearing between said signal amplifier first and second output leads; and first and second individual latch means connected from the first and second output leads of said first and second comparators to turn on respective first and second alarms, each latch means being actuable by a corresponding one of said stepped signals.

2. The invention defined in claim 1, wherein there is provided comparator means to produce an output signal when there is a circuit failure, and third individual latch means actuable by said comparator means output signal, said third individual latch means having an output lead connected to said first and second individual latch means and being actable to unlatch said first and second latch means.

3. The invention as defined in claim 2, including a voltage regulator having first and second output leads; said comparator means including third, fourth and fifth resistors connected in succession in series from said first voltage regulator output lead to said second voltage regulator output lead; first, second, third and fourth differential amplifiers each having an inverting input, a non-inverting input and an output; said fourth junction being connected to the non-inverting input of said fourth amplifier and the inverting input of said third amplifier; said second junction being connected to the inverting input of said first amplifier and the non-inverting input of said second amplifier; said third and fourth resistors having a first common junction; said fourth and fifth resistors having a second common junction; said first common junction being connected to the non-inverting inputs of said first and third amplifiers; said second common junction being connected to the inverting inputs of said second and fourth amplifiers; each of said amplifiers having an output; all of said amplifier outputs being connected to a third common junction; said third common junction being connected to the input of said third latch means.

4. The invention defined in claim 1, including a double pole-quadruple throw switch having gauged first and second poles, said poles being movable in succession from positons in engagement with a respective pair of CHECK contacts to a pair of READY contacts, to a pair of RESET contacts, and then to a pair of TEST contacts, said poles also being movable in succession in the reverse order from said respective pair of TEST contacts, an auxiliary circuit actuable when grounded to inhibit both of said latch means, said first pole CHECK and RESET contacts being grounded, said first pole READY and TEST contacts being electrically isolated except when said first pole lies in engagement therewith, an adjustable source of potential, said second pole CHECK and TEST contacts being connected to said adjustable source of potential, said second pole READY and RESET contacts being electrically isolated except when said second pole lies in engagement therewith, said first pole being connected to said auxiliary circuit and actuable to inhibit said latch means when said first pole is in engagement with said CHECK or RESET contacts, means connected from said second pole to apply an adjustable voltage additive to the voltage between said second and fourth junctions when said switch is in CHECK or TEST positions.

5. A combustible gas detector comprising: a Wheatstone bridge including first, second, third and fourth terminal junctions, first and second combustible gas detector elements, said first element being connected between said first and second junctions, said second element being connected between said second and third junctions, said Wheatstone bridge including first and second resistors, said first resistor being connected between said first and fourth junctions, said second resistor being connected between said third and fourth junctions; source means including a constant current generator connected to deliver a constant current to said first junction and connected to receive said constant current from said third junction, said source means including an unregulated source of electrical power including first and second output leads, a voltage regulator having first and second input leads and first and second output leads, and a constant current generator having first, second and third input leads and first and second output leads, said voltage regulator first and second input leads being connected respectively from said unregulated source first and second output leads, said first constant current generator input lead being connected from said first unregulated source output lead, said second and third constant current generator input leads being connected respectively from said first and second voltage regulator output leads, said constant current generator first and second output leads being respectively connected to said first and third junctions; said constant current generator including third, fourth, fifth, sixth and seventh resistors, a PNP transistor, a potentiometer, a differential amplifier, and field effect transistor (FET); said potentiometer having a winding and a wiper, said constant current generator third input lead being grounded, said third resistor, said winding and said fourth resistor being connected in series in that order from said constant current generator second input lead to ground; said differential amplifier having a non-inverting input, an inverting input and an output; said FET having a source, a drain and a gate; said fourth resistor being connected from said source to ground, said seventh resistor being connected from said third junction to ground; said inverting input being connected to said third junction; said amplifier output being connected to said gate; said PNP transistor having a collector, an emitter and a base; said constant current generator having its first input connected to said emitter, said base and said drain being connected together; said fifth resistor being connected between said collector and said first junction; said wiper being connected to said non-inverting input; first and second bridge output leads connected from said second and fourth junctions, a signal amplifier connected between said bridge output leads, said signal amplifier having at least first and second output leads; first and second comparators each connected from the first and second output leads of said signal amplifier, respectively, said first compatator producing a first stepped signal when the voltage between said bridge output leads corresponds to a fraction x of the lower explosive limit of a detected gas, said second comparator producing a second stepped signal when the voltage between said bridge output leads corresponds to a fraction y of the lower explosive limit of said detected gas, x being larger than y, said first and second comparators having first and second respective output leads; first and second indicator means including first and second alarms for indicating the magnitude of any signal appearing between said signal amplifier first and second output leads; and first and second individual latch means connected from the first and second output leads of said first and second comparators to turn on respective first and second alarms, each latch means being actuable by a corresponding one of said stepped signals.

6. A combustible gas detector comprising: a Wheatstone bridge including first, second, third and fourth terminal junctions, first and second combustible gas detector elements, said first element being connected between said first and second junctions, said element being connected between said second and third junctions, said Wheatstone bridge including first and second resistors, said first resistor being connected between said first and fourth junctions, said second resistor being connected between said third and fourth junctions; source means including a constant current generator connected to deliver a constant current to said first junction and connected to receive said constant current from said third junction, said constant current generator including a differential amplifier having non-inverting and inverting inputs and an output; first means including a voltage regulator for supplying a constant voltage to said non-inverting input; a third resistor connected from said third junction to ground, said inverting input being connected to said third junction; third means connected between said amplifier output to said first junction to increase the electrical current through said third resistor until the potential of said inverting input is essentially equal to that of said non-inverting input; first and second bridge output leads connected from said second and fourth junctions, a signal amplifier connected between said bridge output leads, said signal amplifier having at least first and second output leads; first and second comparators each connected from the first and second output leads of said signal amplifier, respectively, said first comparator producing a first stepped signal when the voltage between said bridge output leads corresponds to a fraction x of the lower explosive limit of a detected gas, said second comparator producing a second stepped signal when the voltage between said bridge output leads corresponds to a fraction y of the lower explosive limit of said detected gas, x being larger than y, said first and second comparators having first and second respective output leads; first and second indicator means including first and second alarms for indicating the magnitude of any signal appearing between said signal amplifier first and second output leads; and first and second individual latch means connected from the first and second output leads of said first and second comparators to turn on respective first and second alarms, each latch means being actuable by a corresponding one of said stepped signals.

* * * * *